Figure 1:
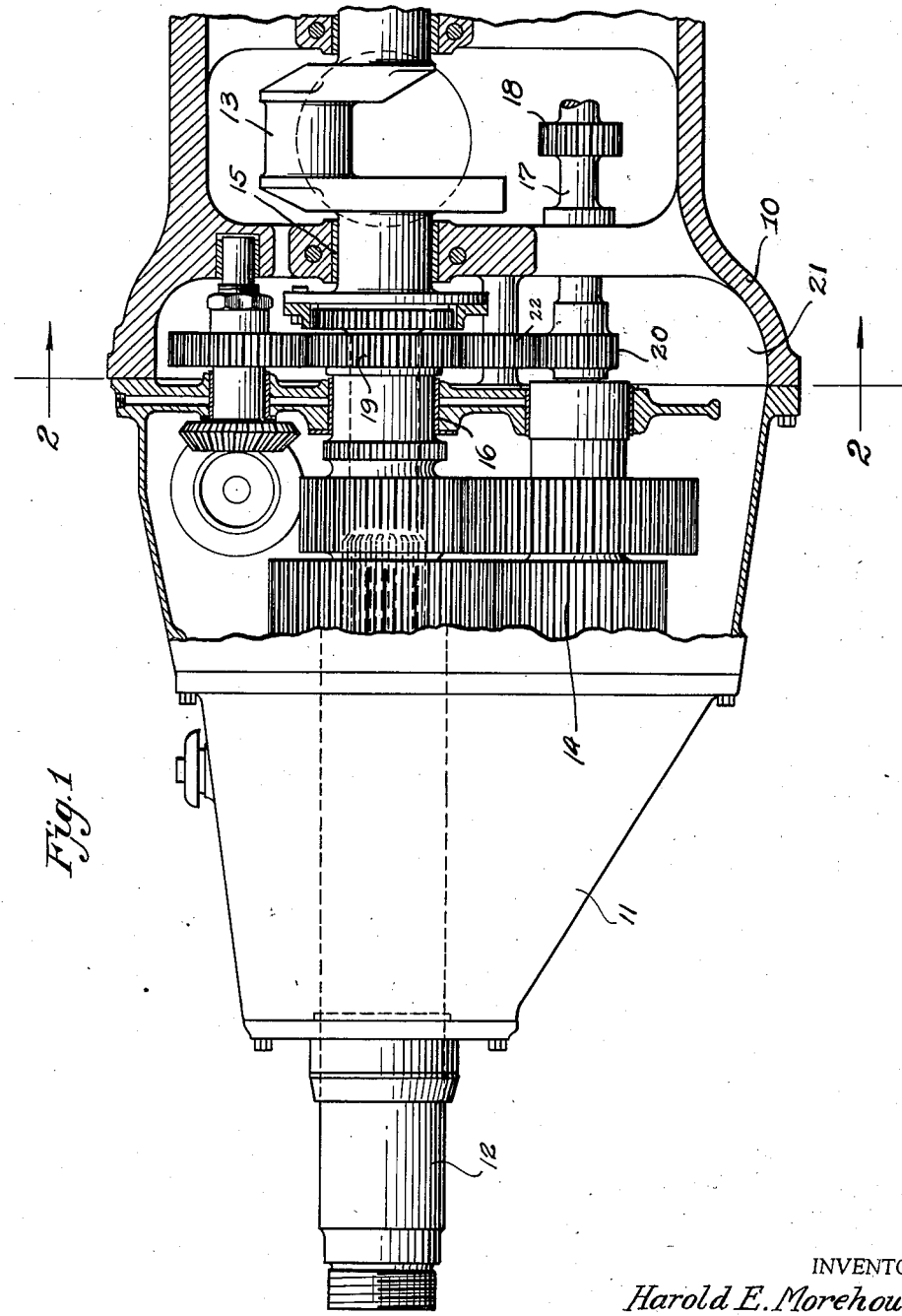

Aug. 18, 1936.    H. E. MOREHOUSE    2,051,568
REVERSIBLE ACCESSORY DRIVING MECHANISM FOR ENGINES
Filed June 7, 1935    2 Sheets-Sheet 1

INVENTOR.
Harold E. Morehouse
BY
G. F. Hauke,
ATTORNEY.

Aug. 18, 1936.     H. E. MOREHOUSE     2,051,568
REVERSIBLE ACCESSORY DRIVING MECHANISM FOR ENGINES
Filed June 7, 1935     2 Sheets-Sheet 2
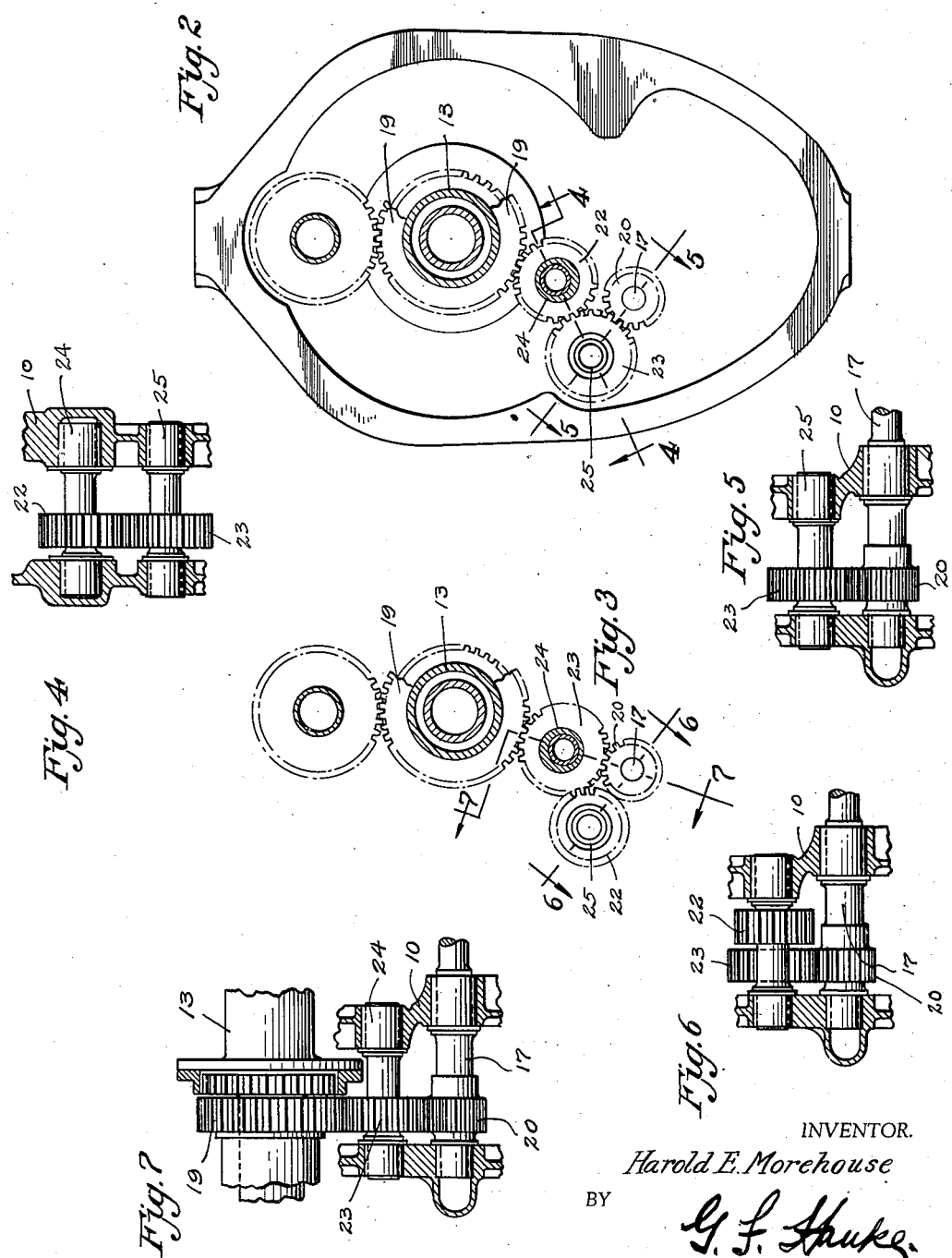
INVENTOR.
Harold E. Morehouse
BY
G. F. Hauke
ATTORNEY.

Patented Aug. 18, 1936

2,051,568

UNITED STATES PATENT OFFICE 2,051,568

REVERSIBLE ACCESSORY DRIVING MECHANISM FOR ENGINES

Harold E. Morehouse, Detroit, Mich., assignor to Continental Motors Corporation, Detroit, Mich., a corporation of Virginia Application June 7, 1935, Serial No. 25,359

5 Claims. (Cl. 74—325)

This invention relates to engines and more particularly to a selective reverse accessory drive for engines particularly adapted for aircraft use, though it will be obvious that the principles of the present invention may be incorporated in engines other than the one herein particularly described.

In aircraft it is at present necessary to provide engines for propelling same which are arranged to be driven in opposite directions. In order to avoid complications in the engine manufacture it is usually customary to provide these engines with reversing mechanism or other means and in the past it has been customery to provide different sets of accessories and drives therefor in order to adapt the engine structure for operation in opposite directions.

An object of the present invention is to provide an engine having an accessory drive which may be selectively reversed in order to have standard accessories which are possible to be used in the engine no matter what the direction of rotation of the engine crankshaft. To this end the present invention is directed and it will be noted that there is provided a simple and compact accessory drive which may be readily and quickly assembled for either forward or reverse engine operation.

A further object of the invention relates to the particular design and arrangement of the novel accessory driving mechanism which eliminates the necessity of special elements, the present elements of the accessory drive being so arranged and constructed as to be selectively positioned to obtain the reverse drive with a minimum of expense and with a minimum of time.

For a more detailed understanding of my invention, reference may be had to the accompanying drawings which illustrate one form which my invention may assume, and in which:

Fig. 1 is a fragmentary longitudinal sectional view of the forward portion of an engine showing the accessory drive mechanism incorporated therewith, Fig. 2 is a transverse sectional view taken substantially on the line 2—2 of Fig. 1 and showing the arrangement of the accessory drive for one direction of engine rotation, Fig. 3 is a further fragmentary transverse sectional view similar to Fig. 2, but showing the accessory drive mechanism arranged for an accessory drive in the opposite direction from that illustrated in Fig. 2, Figs. 4 and 5 are fragmentary detail sectional views taken substantially on the lines 4—4 and 5—5 of Fig. 2, and Figs. 6 and 7 are fragmentary detail sectional views taken substantially on the lines 6—6 and 7—7 of Fig. 3.

I have chosen for purposes of illustration to show my invention as being incorporated in an aircraft engine particularly of the type including a crankcase 10 which has secured on the forward end thereto the gear case 11 which supports the propeller shaft 12 that is geared or otherwise connected in driving connection with the crankshaft 13 by means of suitable gearing 14. The crankcase and gearcase respectively support the crankshaft 13 in suitable bearings 15 and 16, and preferably the accessory drive shaft 17 is likewise supported in suitable bearings carried by the crankcase and gearcase structures. The accessory drive shaft is preferably arranged to extend longitudinally of the engine in parallel relation with the crankshaft and this shaft preferably carries suitable gears 18 through which may be drivingly connected one or more of these various engine accessories in the customary manner.

The crankshaft 13 and accessory drive shaft 17 have respectively secured thereto the crankshaft driving gear 19 and the driven gear 20. Means for driving the driven gear 20 secured to the accessory drive shaft from the crankshaft driving gear are arranged to be preferably supported within the housing 21 at one end of the engine crankcase 10, this means preferably comprising a mechanism which is arranged for selectively connecting said driving and driven gears for forward or reverse engine operation.

This intermediate driving means for drivingly connecting the crankshaft driving gear 19 with the driven gear 20 carried by the accessory drive shaft includes intermediate gearing comprising cooperating interchangeable gears of different pitch diameter, and suitable bearing supports for said gears which permit the interchangeable assembly. Referring more particularly to Fig. 2 it will be noted that the intermediate gearing specifically comprises intermediate gears 22 and 23 of different pitch diameters, the gear 22 having a smaller pitch diameter than the gear 23. The gear 22 is supported on an adjustable bearing 24 which, in the present instance, comprises an eccentric member which may be angularly adjusted to vary the position of the center about which the intermediate gear carried thereby rotates. It will be noted that the gear 22 is arranged to mesh with the crankshaft driving gear 19 and with the gear 23 which is supported on the fixed bearing 25. This latter gear 23 is arranged to engage or mesh with the driven gear 20 carried by the accessory drive shaft 17.

In order to reverse the direction of rotation of the accessory drive shaft with respect to the engine crankshaft to accommodate the same for reverse and forward engine operation, it becomes necessary to differently connect the driving and driven gears, and this is accomplished by interchanging the intermediate driving gears 22 and 23. In Fig. 3 it will be noted that the eccentric bearing 24 is adjusted to correctly position the gear center and the gear 23 of relatively larger pitch diameter is supported thereby and is arranged to directly engage or mesh with the crankshaft driving gear 19 and the driven gear 20 carried by the accessory drive shaft 17. The intermediate driving gear 22 of smaller pitch diameter is in this instance of no practical use since it is thus an extra gear and does not function in driving the accessory drive shaft. It is, however, supported on the fixed bearing 25 and is preferably turned around as shown in Fig. 6 so as to be out of mesh with the gear 23 and gear 20.

It will be thus noted that the intermediate gear of larger pitch diameter is arranged to be either supported by the adjustable bearing in direct driving relation with the crankshaft driving gear 19 and the gear 20 carried by the accessory drive shaft or by the fixed bearing 25 in which case it is driven by the intermediate gear 22, that is now supported on the adjustable bearing in engagement with the crankshaft driving gear. This selective assembly of the intermediate gears provides a convenient and readily assembled gear assembly for selectively driving the accessory drive shaft to accommodate the same for forward or reverse engine operation.

A practical adaptation of an engine of this character to an aircraft is such as to provide for multiple engine aircraft assemblies, said engines operating in opposite directions, but both engines carrying the same accessories and including accessory drive shafts which are operated in opposite directions with respect to the engine crankshaft.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. In an internal combustion engine having a crankshaft and an accessory drive shaft, driving means selectively connecting said accessory drive shaft to said crankshaft and including intermediate gears having different pitch diameters, an adjustable bearing for selectively supporting the gear of smaller pitch diameter in direct driving relation with said crankshaft, a fixed bearing for supporting said intermediate gear of larger pitch diameter, said assembly being constructed and arranged to also support the intermediate gear of larger pitch diameter in said adjustable bearing whereby to engage same in direct driving relation with said crankshaft and accessory shaft for providing a reverse drive of said accessory shaft, said smaller diameter gear having no driving connection with the accessory shaft and crankshaft when supported in the fixed bearing and when supported by said adjustable bearing said smaller intermediate gear is arranged to have no direct driving connection with the accessory shaft while in direct driving relation with the crankshaft.

2. In an internal combustion engine having a crankshaft and an accessory drive shaft, driving and driven gears respectively secured to said crankshaft and said accessory drive shaft, driving means selectively connecting said driving and driven gears and including intermediate gearing comprising cooperating interchangeable gears of different pitch diameter, an adjustable bearing and a fixed bearing, said bearings selectively supporting either of said intermediate gears, said driven gear being directly driven by the larger intermediate gear, said larger intermediate gear being drivingly engaged by said smaller intermediate gear, said adjustable bearing constructed and arranged to shift said bearing center relative to said crankshaft and accessory shaft axes permitting the mounting of said larger intermediate gear on said adjustable bearing in direct driving relation with said driving and driven gears.

3. In an internal combustion engine having a crankshaft and an accessory drive shaft, intermediate driving mechanism connecting said accessory drive shaft to said crankshaft and including a driving gear secured to said crankshaft and a driven gear secured to said accessory shaft, a small intermediate gear engaging said driving gear, a large intermediate gear engaging said driven gear and said small intermediate gear, and an adjustable bearing for said small intermediate gear and constructed and arranged for selective adjustment to adjust the bearing center relative to said crankshaft and accessory shaft axes, said large intermediate gear constructed and arranged to be substituted for said small intermediate gear in direct engagement with said driving and driven gears.

4. In an internal combustion engine having a crankshaft and an accessory drive shaft, intermediate driving mechanism connecting said accessory drive shaft to said crankshaft and including a driving gear secured to said crankshaft and a driven gear secured to said accessory shaft, a small intermediate gear engaging said driving gear, a large intermediate gear engaging said driven gear and said small intermediate gear, and an adjustable bearing for said small intermediate gear and constructed and arranged for selective adjustment to adjust the bearing center relative to said crankshaft and accessory shaft axes, a fixed bearing for said large intermediate gear, said large and small intermediate gears constructed and arranged for interchangeable assembly on said adjustable and fixed bearings whereby to directly connect said large intermediate gear with said driven gear and said small intermediate gear or with said driven gear and said driving gear.

5. In an internal combustion engine having a crankshaft and an accessory drive shaft, driving and driven gears respectively carried by said crankshaft and accessory drive shaft, intermediate driving means connecting said driving and driven gears and including a pair of intermediate gears of different pitch diameter, an eccentric bearing manually adjustable to shift the bearing axis relative to the axes of said driving and driven gears, a fixed bearing, said smaller intermediate gear carried by said eccentric bearing and arranged in direct driving relation with said driving gear in one adjustment of said eccentric bearing, said larger intermediate gear supported by said fixed bearing in direct driving relation with said smaller intermediate gear and said driven gear carried by said accessory shaft, said large and small intermediate gears being interchangeable in another adjustment of said eccentric bearing for providing an assembly in which said larger intermediate gear is supported by said eccentric bearing in direct driving relation with said driving and driven gears, whereby to provide for a reverse drive of said accessory shaft.

HAROLD E. MOREHOUSE.